(12) United States Patent
Davey

(10) Patent No.: US 7,269,972 B2
(45) Date of Patent: Sep. 18, 2007

(54) PLANT AND METHOD FOR FRACTIONATING AND PURIFYING SYNTHESIS GAS

(75) Inventor: William Davey, Frankfurt am Main (DE)

(73) Assignee: Lurgi AG, Frankfurt am Main (DE)

( * ) Notice: Subject to any disclaimer, the term of this patent is extended or adjusted under 35 U.S.C. 154(b) by 338 days.

(21) Appl. No.: 10/503,484

(22) PCT Filed: Mar. 22, 2003

(86) PCT No.: PCT/EP03/03010

§ 371 (c)(1),
(2), (4) Date: Aug. 3, 2004

(87) PCT Pub. No.: WO03/106331

PCT Pub. Date: Dec. 24, 2003

(65) Prior Publication Data

US 2005/0076672 A1    Apr. 14, 2005

(30) Foreign Application Priority Data

Jun. 13, 2002    (DE) .................. 102 26 210

(51) Int. Cl.
*F25J 3/00* (2006.01)
(52) U.S. Cl. .............................. 62/617; 62/920; 62/934
(58) Field of Classification Search .................. 62/617, 62/920, 934
See application file for complete search history.

(56) References Cited

U.S. PATENT DOCUMENTS

| | | | | |
|---|---|---|---|---|
| 3,186,145 A | * | 6/1965 | Pelton et al. .................. | 95/180 |
| 4,338,107 A | * | 7/1982 | Swallow ...................... | 62/625 |
| 4,544,390 A | * | 10/1985 | Traficante .................... | 62/632 |
| 6,073,461 A | * | 6/2000 | McNeil et al. ................ | 62/625 |
| 6,098,424 A | * | 8/2000 | Gallarda et al. .............. | 62/632 |
| 6,178,774 B1 | * | 1/2001 | Billy et al. ................... | 62/620 |
| 6,696,026 B2 | * | 2/2004 | Pagani et al. ................ | 422/148 |

* cited by examiner

*Primary Examiner*—William C. Doerrler
(74) *Attorney, Agent, or Firm*—Andrew Wilford

(57) ABSTRACT

An plant unit for fractionating and purifying synthesis gas is described, which is comprised of a device for partially condensing synthesis gas and a device for nitrogen washing, whereat the device for nitrogen washing is adjacent to the device for partial condensation.

12 Claims, 1 Drawing Sheet

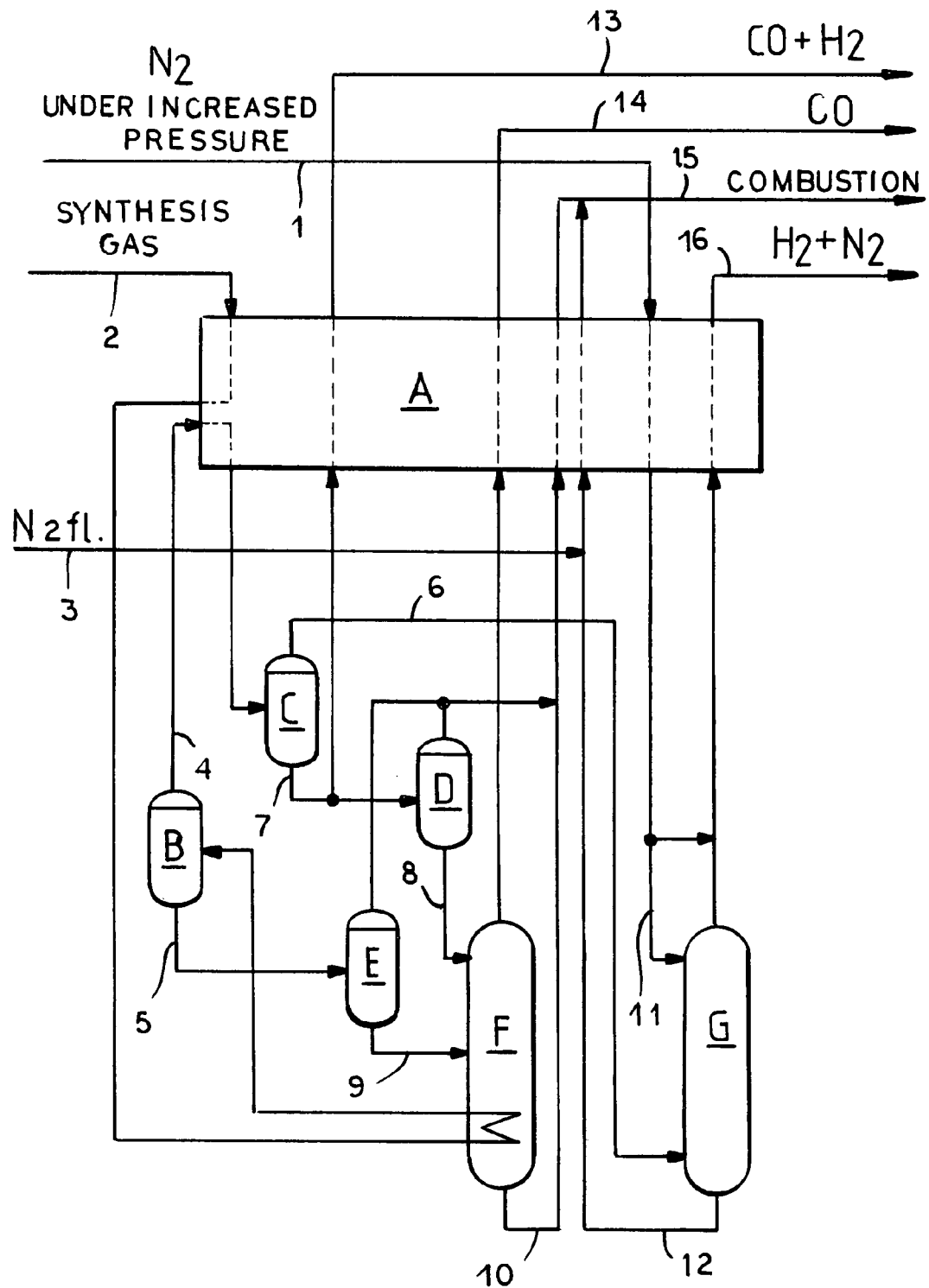

PLANT AND METHOD FOR FRACTIONATING AND PURIFYING SYNTHESIS GAS

CROSS REFERENCE TO RELATED APPLICATIONS

This application is the U.S. national phase of PCT application PCT/EP03/03010, filed 22 Mar. 2003, published 24 Dec. 2003 as WO 2003/106331, and claiming the priority of German patent application 10226210.1 itself filed 13 Jun. 2002.

FIELD OF THE INVENTION

The subject of the invention is a plant and a method for fractionating and purifying synthesis gas, allowing one to perform two process steps in one single plant. In particular, the partial condensation of synthesis gas and the washing of synthesis gas by using liquid nitrogen are performed in one single plant, thereby yielding a number of purified gases or gas mixtures that can be directly employed for further chemical syntheses.

BACKGROUND OF THE INVENTION

For fractionating and purifying synthesis gases, it is known to use production plants in which one generally can only separate one part of the synthesis gas that has been produced by the partial oxidation of natural gas. In these known methods, carbon monoxide is separated by means of refrigeration engineering in one plant, which is known as a device for partial gas condensation (1). Means of refrigeration engineering are also employed to obtain the synthesis gas required for ammonia production, where a plant uses a method that is known as "nitrogen washing" (1). Both plants have a completely different construction type. The only common feature of these two techniques of refrigeration engineering is to be found in the use of a multiway plate heat exchanger for cooling off and reheating the gas streams. Each of these methods requires a cooling device, which in a partial condensation unit in general can utilizes the expansion of carbon monoxide or hydrogen, in which case a unit for nitrogen washing requires liquid nitrogen.

SUMMARY OF THE INVENTION

In the present invention, two steps of purification are combined in a single method, the crude synthesis gas being cooled off to cryogenic temperatures at which the carbon monoxide can be separated from the synthesis gas. The remaining hydrogen is purified in a nitrogen washing column, followed by a subsequent, optional mixing with further nitrogen in order to be used for ammonia synthesis.

The advantages of the plant according to the invention in comparison to the prior art are mainly that a) a heat exchange much more efficient is realised in the plate heat exchangers;

b) a special cooling system in the form of an expander is not required for the purification of carbon monoxide, so that the operating safety of the total system is improved;

c) the reliability of gas supply is thereby improved so that, in case of reduced demand for either carbon monoxide or for ammonia synthesis gas, the plant according to the invention can be kept cool by the maintained purification of the other synthesis gas and can be very quickly restored to a full production rate of both synthesis gases;

d) the plant according to the invention can be constructed and built in a much more economical manner than two separate cryogenic systems.

The invention accordingly is a plant for the fractionation and purification of synthesis gas, which is comprised of a device for partially condensing synthesis gas and of a device for nitrogen washing, the device for nitrogen washing being adjacent to the device for partial condensation.

BRIEF DESCRIPTION OF THE DRAWING

The plant according to the invention is schematically depicted in the sole FIGURE of the drawing. The composition of the plotted streams of matter can be seen in Table 1.

SPECIFIC DESCRIPTION

The plant according to the invention has the following interconnected devices: a heat exchanger A for cooling off the synthesis gas fed at 2 to the plant, a separator B connected to the heat exchanger A for fractionating the synthesis gas 2 into a gas fraction 4 mainly consisting of hydrogen and carbon monoxide and into a liquid fraction 5 mainly consisting of carbon monoxide and methane; a separator C for further fractionating the gas fraction 4 coming from the separator B in order to produce a gas fraction 6 predominantly consisting of hydrogen and a liquid 7 predominantly consisting of carbon monoxide; an evaporator D in which the hydrogen being absorbed in the liquid 7 is evaporated and by which the remaining liquid 8 mainly containing carbon monoxide can be fed to a distillation column F; a further evaporator E in which the remaining absorbed hydrogen in the liquid fraction 5 of separator B is removed by evaporation and by means of which the liquid 9 mainly containing carbon monoxide and methane can be fed to the distillation column F; a distillation column F for the separation of gaseous carbon monoxide and for obtaining methane as a liquid depositing at the bottom of the column; and a washing column G for removing contaminations from the gas fraction 6 coming from the separator C and mainly containing hydrogen, this purification being accomplished by using liquid nitrogen and the contaminants being used as a burnable gas 12.

The heat exchanger A preferably is a multiway plate heat exchanger in which the exchanger plates generally consist of aluminum. The heat exchanger A can receive a multiplicity of gas and liquid feed lines and is able to cool them off or to heat them to preset temperatures.

The synthesis gas 2 supplied from the heat exchanger A to the plant according to the invention is fractionated in the separator B into a gas fraction 4 rich in hydrogen and a liquid phase 5 rich in carbon monoxide and methane. This separation is accomplished at a pressure of about 78 bar and a temperature of $-171 \pm 10°$ C. The gas fraction 4 is further cooled off in the heat exchanger A and then fed to the separator C. The liquid 5 is decompressed to a pressure of about 6 bar and fed to the evaporator E.

The decompression evaporator C is a device in which the hydrogen-rich gas 4 that is supplied from the separator B is further fractionated, namely into a gas 6 predominantly consisting of hydrogen and into a liquid 7 predominantly consisting of carbon monoxide. This separation is performed at a pressure of about 78 bar and a temperature of $-195 \pm 10°$ C. The gas 6 still contaminated by carbon monoxide is fed to the bottom part of the washing column G. The liquid 7 is divided into the two streams, one stream designated for further purification and another stream 13 containing excess carbon monoxide still containing hydrogen. It can also be used as a synthesis gas for generating products like methanol that are produced from carbon monoxide and hydrogen.

The carbon monoxide 7 designated for further purification is decompressed to a pressure of about 6 bar and fed to the flash evaporator (decompression evaporator) D.

In the evaporator D, the hydrogen absorbed in the carbon monoxide is evaporated by flash evaporation. It can then, after having passed through the heat exchanger A, be used as burnable gas 15. The flash evaporation is accomplished at a pressure of about 6 bar and a temperature of $-195\pm10°$ C. The liquid 8 produced in this process, is fed to the distillation column F.

The liquid 5 that has been obtained in the separator B is fed to the flash evaporator E, and the hydrogen absorbed in the liquid carbon monoxide is evaporated and can then be discharged via the heat exchanger A and used as a burnable gas. This flash evaporation is accomplished at a pressure of about 6 bar and a temperature of $-171\pm10°$ C. The liquid 9 obtained in the receptacle E is fed to the distillation column F.

The distillation column F serves to produce highly pure carbon monoxide having a purity of greater than 98% by volume. The distillation column F is pressurized at a pressure of about 5 bar an in its upper portion is at a temperature of about $-175°$ C. and in its bottom portion at about $-155°$ C. Into this column F the mixture 9 of carbon monoxide and methane from the flash evaporator E and the liquid 8 mainly consisting of carbon monoxide from the flash evaporator D have been introduced.

The distillation in this column F is accomplished by heating by means of a heat exchanger passed through by a synthesis gas of arbitrary composition or by means of a discharge located at the bottom of the column and receiving the liquid accumulating there, this liquid being reconducted into the distillation column after having passed through the heat exchanger A (not shown). The gas 14 accumulating in the upper part of the distillation column F is nearly completely pure carbon monoxide and is reconducted into the heat exchanger A. It is then available for syntheses, when high-purity carbon monoxide is required.

The liquid 10 precipitating at the bottom of the distillation column F is nearly pure liquid methane that is decompressed to a pressure of about 1.3 bar and, after having passed through the heat exchanger A, is available as a component of the burnable gas 15.

The washing column G serves to purify hydrogen by means of liquid nitrogen 11 and to simultaneously generate a hydrogen/nitrogen mixture 16. The washing column G is pressurized to a pressure of about 77 bar and is at a temperature of $-185°$ C.$\pm 10°$ C. Nearly pure gaseous hydrogen 6 from the flash evaporator C is introduced into the bottom part of the washing column G. Liquid nitrogen 11 is introduced into the washing column G so that in the washing column G a mixture of hydrogen and nitrogen is produced that has residual concentrations of carbon monoxide and argon of less than 5 ppm and 150 ppm, respectively. The product withdrawn at the upper portion of the washing column G can then be mixed with further gaseous nitrogen 11 and be adjusted to a molar proportion of hydrogen to nitrogen of about 3:1, in general to a molar proportion of 2.995, and be provided as a synthesis gas for ammonia synthesis via the heat exchanger A. At the bottom of the washing column G, a mixture of liquid carbon monoxide, argon and nitrogen is formed that is decompressed to a pressure of 1.3 bar and used as a burnable gas via the heat exchanger A.

The liquid nitrogen employed in the washing column G has a purity of 99.995% and is liquefied in the heat exchanger A and fed to the washing column G as a high pressure nitrogen gas. This form of nitrogen can also be comprised of several streams including a stream 1 of pressurized nitrogen and a stream 3 of liquid nitrogen that are fed to the washing column at different pressures. The mixture of the different streams of nitrogen can then be compressed by pumping to reach the required operating pressure.

The liquid nitrogen serves to cool off the low pressure liquid streams at the bottom of the washing column G.

The plant according to the invention is a central part in a plant for the fractionation of synthesis gas, which is described in the German patent application 102 26 209.8 being filed at the same date and U.S. patent application Ser. No. 10,503,845 filed 03 Aug. 2004. In this specification, the complete method for the fractionation of synthesis gas is described. Thereby, at first the carbon dioxide contained in the synthesis gas is separated. The remaining gas mixture, which predominantly consists of carbon monoxide and hydrogen, constitutes the stream of the synthesis gas 2, the fractionation of which has been described by employing the plant according to the invention.

References:
1. "Gas Production", Ullman's Encyclopedia of Industrial Chemistry, Vol. A12, VCH Verlagsgesellschaft mbH (1989).

TABLE I

| Gas | 1 | 2 | 3 | 4 | 5 | 6 | 7 | 8 | 9 |
|---|---|---|---|---|---|---|---|---|---|
| Composition (% by volume) | | | | | | | | | |
| Methane | | 2.59 | | 1.00 | 23.04 | 0.03 | 6.34 | 7.22 | 29.80 |
| Carbon monoxide | | 19.94 | | 16.46 | 64.16 | 4.81 | 82.04 | 91.43 | 69.23 |
| Argon | | 0.10 | | 0.07 | 0.42 | 0.01 | 0.40 | 0.45 | 0.48 |
| Hydrogen | | 77.38 | | 82.49 | 12.39 | 95.15 | 11.22 | 0.90 | 0.48 |
| Nitrogen | 99.99 | | 99.99 | | | | | | |
| Temp. °C. | 40 | 36 | −195 | −171 | −171 | −195 | −195 | −193 | −178 |
| Pressure (bar abs) | 80 | 77 | 2 | 77 | 77 | 77 | 77 | 5.8 | 5.8 |
| Vapor portion | 1 | 1 | 0 | 1 | 0 | 1 | 0 | 0 | 0 |
| Rate of flow (t/h) | 142 | 149 | 6 | 118 | 32 | 51 | 67 | 41 | 27 |

TABLE I-continued

| Gas stream | 10 | 11 | 12 | 13 | 14 | 15 | 16 |
|---|---|---|---|---|---|---|---|
| Composition (% by volume) | | | | | | | |
| Methane | 91.69 | | 0.41 | 6.34 | 0.70 | 16.97 | |
| Carbon monoxide | 7.66 | | 69.00 | 82.04 | 98.14 | 46.89 | 2.57 |
| Argon | 0.65 | | 0.19 | 0.40 | 0.41 | 0.25 | |
| Hydrogen | | | 13.31 | 11.22 | 0.75 | 16.69 | 74.97 |
| Nitrogen | | 99.99 | 17.08 | | | 19.20 | 25.03 |
| Temp (° C.) | −143 | −185 | −196 | 31 | 31 | 31 | 31 |
| Pressure bar abs | 5.8 | 77 | 76 | 76 | 50 | 1.2 | 75 |
| Vapor portion | 0 | 0 | 0 | 1 | 1 | 1 | 1 |
| Rate of flow (t/h) | 6.2 | 39 | 26 | 63 | 25 | 43 | 166 |

The invention claimed is:

1. A plant for the fractionation and purification of a synthesis gas, the plant comprising the following interconnected devices:
   a primary heat exchanger for cooling off the synthesis gas fed to the plant;
   a separator connected to the primary heat exchanger for fractionating the synthesis gas into a gas fraction mainly consisting of hydrogen and carbon monoxide, and into a liquid fraction mainly consisting of carbon monoxide and methane;
   a first evaporator for further fractionating the gas fraction supplied from the separator in order to produce a gas fraction predominantly consisting of hydrogen and a liquid predominantly consisting of carbon monoxide;
   a second evaporator in which the hydrogen absorbed in the liquid from the first evaporator is evaporated and remaining liquid mainly containing carbon monoxide is fed to a distillation column;
   a third evaporator in which the remaining, absorbed hydrogen in the liquid fraction 5 of separator B is removed by evaporation and that produces a liquid mainly containing carbon monoxide and methane;
   a distillation column receiving the liquid from the third evaporator for the separation of gaseous carbon monoxide and for obtaining methane therefrom as a liquid depositing at the bottom of the distillation column; and
   a washing column for removing contaminants from the gas fraction from the first evaporator and mainly consisting of hydrogen, this purification using liquid nitrogen and the contaminants being used as a burnable gas.

2. The plant according to claim 1 wherein the primary heat exchanger can receive a multiplicity of feed lines for gases and liquids and is able to cool them off or to heat them to preset temperatures.

3. The plant according to claim 1 wherein the first, second, and third evaporators are flash or decompression evaporators in which gas dissolved in a liquid, can be removed.

4. The plant according to claim 1 wherein the distillation column includes a secondary heat exchanger traversed by a synthesis gas of arbitrary composition and a discharge being located at the bottom of the distillation column receiving the liquid accumulating there, this liquid being reconducted to the distillation column after having passed through the primary heat exchanger.

5. The plant according to claim 1 wherein the washing column comprises feed lines for gaseous and liquid nitrogen.

6. The plant according to claim 1 wherein the separator operates at a pressure of about 78 bar and a temperature of −171+10° C.

7. The plant according to claim 1 wherein the first evaporator operates at a pressure of about 78 bar and a temperature of −195+10° C.

8. The plant according to claim 1 wherein the second evaporator operates at a pressure of 6 bar and a temperature of −195+10° C.

9. The plant according to claim 1 wherein the third evaporator operates at a pressure of 6 bar and a temperature of −171+10° C.

10. The plant according to claim 1 wherein the distillation column operates at a pressure of about 5 bar, a temperature of about −175° C. at the column head and a temperature of about −155° C. at the bottom of the column.

11. The plant according to claim 1 wherein the washing column operates at a column pressure of about 77 bar and a temperature of −185+10° C.

12. The plant according to claim 1 wherein a gas mixture withdrawn at the upper portion of the washing column is adjusted to a molar proportion of $H_2/N_2$ of about 3:1 by adding gaseous nitrogen.

* * * * *

UNITED STATES PATENT AND TRADEMARK OFFICE
CERTIFICATE OF CORRECTION

PATENT NO. : 7,269,972 B2 Page 1 of 1
APPLICATION NO. : 10/503484
DATED : September 18, 2007
INVENTOR(S) : William Davey et al.

It is certified that error appears in the above-identified patent and that said Letters Patent is hereby corrected as shown below:

In the left column, line 75, the name of the second inventor should be added, shown as:

( -- Thomas Wurzel, Oberursel (DE) -- )

Signed and Sealed this

Fourth Day of December, 2007

JON W. DUDAS
*Director of the United States Patent and Trademark Office*